United States Patent [19]
Monzi

[11] 3,918,948
[45] Nov. 11, 1975

[54] METHOD OF MAINTAINING PAIRED GLASS SHEETS IN ALIGNMENT DURING BENDING

[75] Inventor: Tulio J. Monzi, New Kensington, Pa.

[73] Assignee: PPG Industries, Inc., Pittsburgh, Pa.

[22] Filed: July 19, 1974

[21] Appl. No.: 490,163

[52] U.S. Cl. .................................. 65/25 R; 65/106
[51] Int. Cl.² .................................... C03B 23/02
[58] Field of Search ............ 65/24, 25 R, 323, 106, 65/107, 273, 275, 245; 156/286, 580

[56] References Cited
UNITED STATES PATENTS

| | | | |
|---|---|---|---|
| 1,892,987 | 1/1933 | Kleinschmit | 156/580 X |
| 3,265,484 | 8/1966 | Ritter, Jr. | 65/275 X |

*Primary Examiner*—Arthur D. Kellogg
*Attorney, Agent, or Firm*—Edward I. Mates

[57] ABSTRACT

A method and apparatus for maintaining a pair of glass sheets in aligned relationship to one another during their simultaneous bending in the fabrication of laminated curved safety glass windows.

6 Claims, 6 Drawing Figures

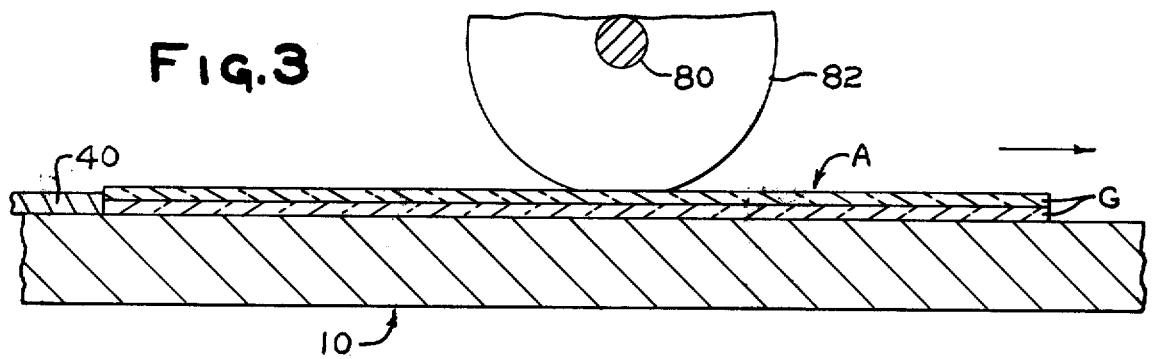
Fig. 3
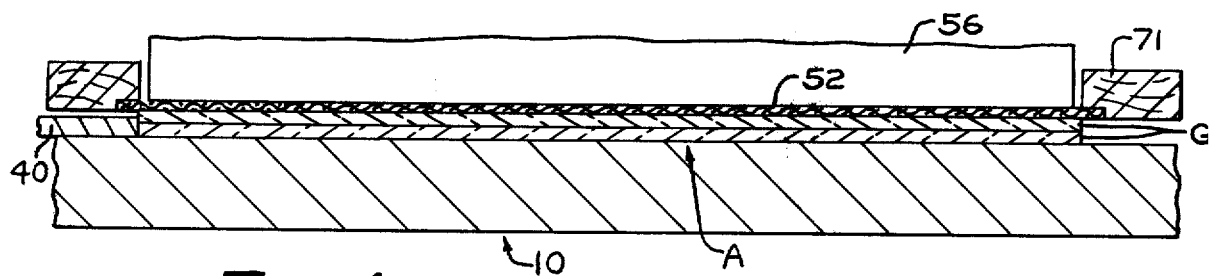
Fig. 4
Fig. 5
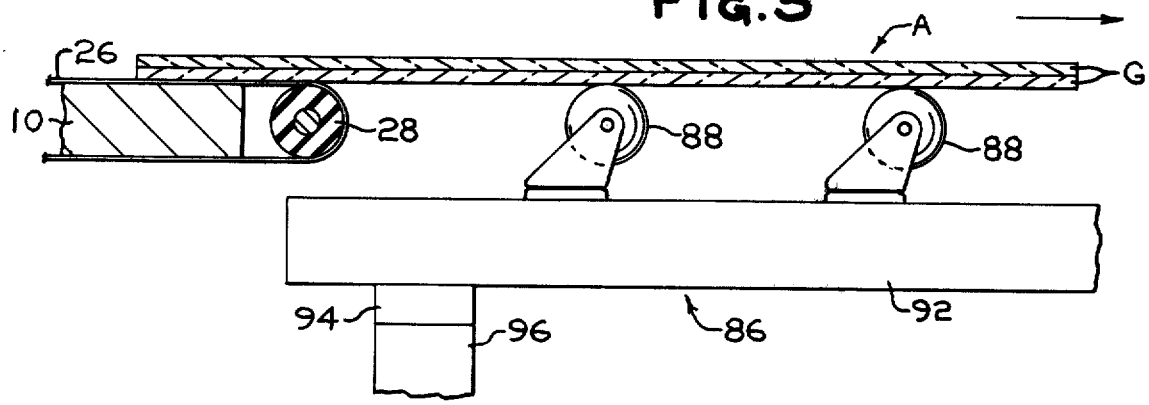
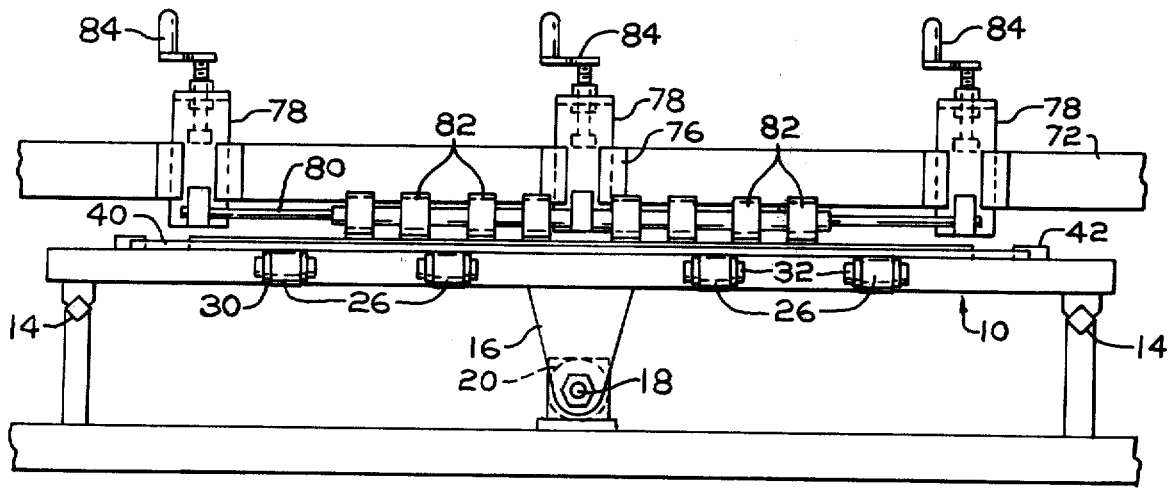
Fig. 6

METHOD OF MAINTAINING PAIRED GLASS SHEETS IN ALIGNMENT DURING BENDING

BACKGROUND OF THE INVENTION

1. Field of the Invention

The present invention relates to treating glass sheets and particularly relates to a method and apparatus for treating glass sheets to be bent simultaneously during the processing of fabricated, bent, laminated, safety glass windshields.

2. Description of the Prior Art

In the fabrication of laminated, bent, safety glass windshields used as viewing closures for vehicles, airplanes, etc., a pair of glass sheets is mounted in bending relation to an upward facing shaping surface of a glass sheet bending mold with suitable parting material disposed at the interfacial surface between the two glass sheets. The parting material is preferably either a mica dust applied as depicted in U.S. Pat. No. 2,697,676 to Lloyd V. Black and Florian V. Atkeson or in the form of a finely divided diatomaceous earth or other similar refractory material applied in the form of a liquid suspension containing approximately one percent to two percent of said finely divided refractory material. The glass sheets are mounted with the parting material therebetween above a bending mold. The details of the liquid suspension are described in U.S. Pat. No. 2,725,320 to Florian V. Atkeson and James S. Golightly.

The assembly of two glass sheets with parting material therebetween is mounted in bending relation to an outline bending mold, such as the mold depicted in U.S. Pat. No. 2,933,856 to Walter W. Barcikowski and Chester W. Sabotka. The mold supporting the glass sheets is one of a series of molds that moves transversely through a tunnel-like bending and annealing lehr such as one of the type depicted in U.S. Pat. No. 2,794,300 to James S. Golightly. In the lehr, the glass sheets are heated to an elevated temperature sufficient to soften the glass sheets so that they sag by gravity into conformity with the shape of the upwardly facing shaping surface of the molds.

At the entrance to the bending and annealing lehr, there is a loading station where a pair of operators load each bending mold in turn with an assembly of aligned glass sheets. In an attempt to increase the rate of production, the glass sheet laden molds are accelerated as rapidly as possible to clear the loading station as frequently as possible to enable the operators working at the glass bending line to load the next successive glass bending mold to arrive at the glass loading station as promptly as possible. Recently, the requirements for increasing production rates have become so great that the glass laden molds have been accelerated to such an extent as to cause the upper glass sheet of the assembly of glass sheets to slip relative to the lower sheet of the assembly. Therefore, the glass sheets of the assembly become misaligned before they are shaped, and the shape imposed on the upper glass sheet is sufficiently different from the shape imposed on the lower glass sheet of the assembly to make it impractical, if not completely impossible, to align the two glass sheets properly for lamination with an interlayer of conventional thermoplastic interlayer material, such as a polyvinyl acetal, e.g., plasticized polyvinyl butyral, or polyurethane, or the like.

SUMMARY OF THE INVENTION

The problem of sliding causing misalignment during the rapid change of movement incidental to the glass bending operation has been solved by the present invention by removing sufficient fluid from the interface between the glass sheets of the assembly before mounting the assembly on the bending mold that a sudden change in mold velocity does not result in the aforesaid misalignment. According to the present invention, the glass sheet assembly to be bent simultaneously is supported in position beneath pressure applying means, relative motion is provided between said assembly and said pressure applying means across an entire dimension of the assembly to be bent while the pressure applying means is held in pressurized engagement against the upper surface of said assembly to force out sufficient fluid entrapped between said glass sheets of the assembly to increase the friction between said glass sheets of said assembly before mounting the assembly on the bending mold.

According to a preferred embodiment of the present invention, the assembly is passed beneath freely rotating nipper rolls that are held in pressurized engagement against the upper surface of the assembly while an entire dimension of the assembly is moved in pressurized engagement with the nipper rolls to drive out entrapped fluid. In an alternate embodiment of the invention in which the upper surface of the upper glass sheet is coated with a pattern of coating material needed for satisfying the requirements of automobile designers (or a pattern of electroconductive coating material useful for an antenna for a radio for the vehicle), a pattern of coating material is applied across the upper surface of a partial mask such as a silk screen and a squeegee is held in sufficient pressurized engagement while moved across an entire dimension of the assembly to force out entrapped fluid from the interfacial surface of said assembly while simultaneously applying said pattern.

The present invention will be understood more clearly in the light of the description of a specific embodiment thereof which follows.

BRIEF DESCRIPTION OF THE DRAWINGS

In the drawings which form part of the description of the illustrative embodiment.

FIG. 3 is an enlarged fragmentary sectional view showing how pressure applying means in the form of freely rotatable nipper rolls are held in pressurized engagement against the assembly as the assembly moves thereunder to enable the nipper rolls to force entrapped fluid from between the glass sheets forming the assembly to be bent simultaneously;

FIG. 4 is a schematic cross sectional view showing a moving squeegee moving across the assembly in pressurized engagement against the upper surface of said assembly to impart a pattern of coating material against the upper surface of the upper glass sheet of the assembly while helping to force fluid entrapped between the two glass sheets of the assembly from the interface between the two glass sheets at the same time;

FIG. 5 is an enlarged fragmentary cross sectional view showing the assembly being transferred to an unloading caster-type table; and FIG. 6 is a fragmentary end elevation showing how the vertical position of the nipper rolls of FIG. 3 may be adjusted relative to the path taken by the upper surface of the assembly carried by a table from a loading position depicted in FIGS. 1 and 2 to the said applying position depicted in FIG. 4.

DESCRIPTION OF THE PREFERRED EMBODIMENT

Figure 1:
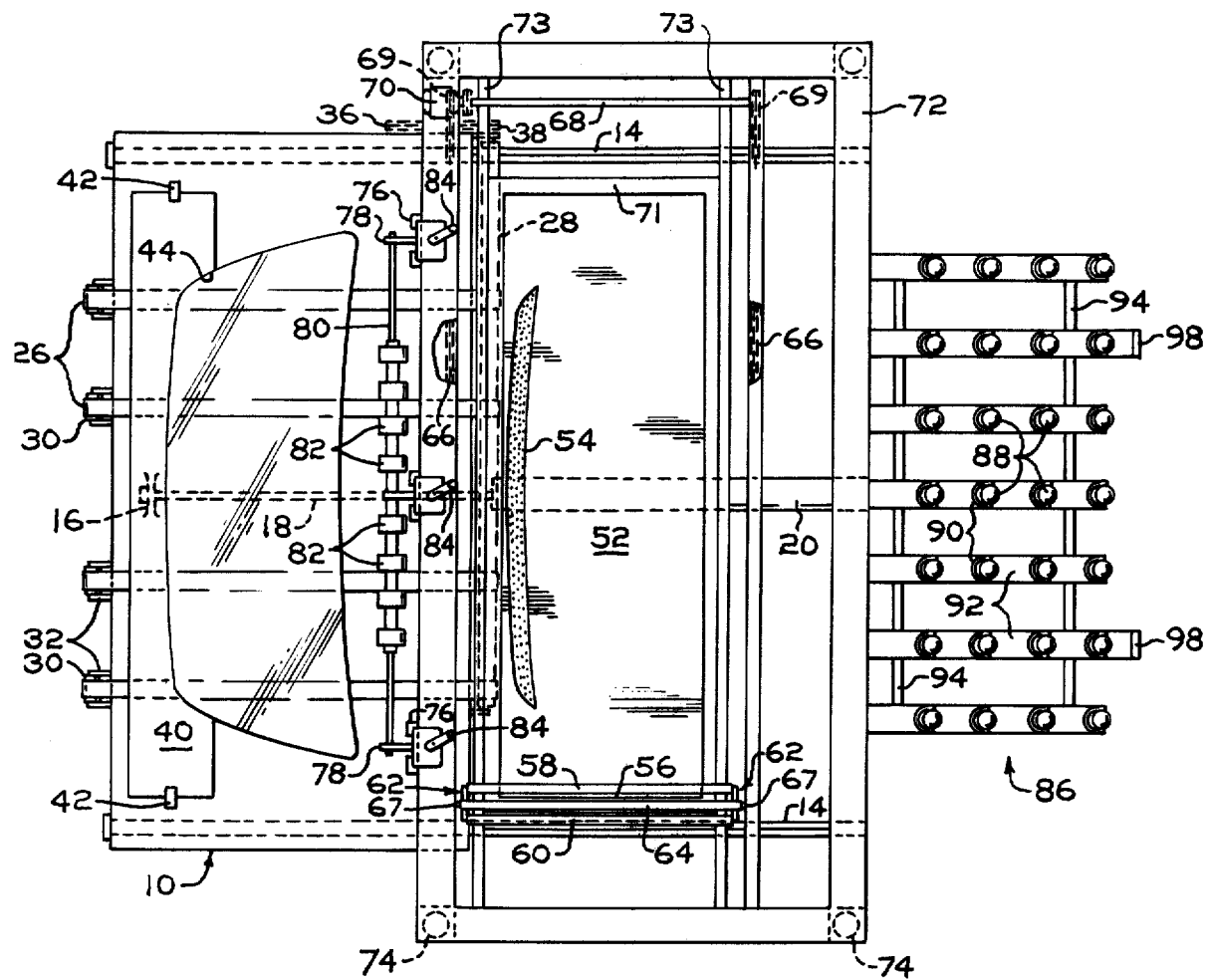
FIG. 1 is a plan view of apparatus useful to attain the object of the present invention in the position occupied when an assembly of glass sheets is mounted for treatment.

Referring to the drawings, the apparatus for treating glass sheets comprises a glass supporting table 10 provided with four downwardly depending slide members 12, two for each end edge of the table 10. Each pair of slide members 12 is slideably supported by a horizontally extending rail 14. Table 10 is provided with position adjusting means comprising a bracket 16 attached to the free end of a piston rod 18 whose position is actuated by a two way piston 20 between an upstream shown in FIGS. 1 and 2 and a downstream position shown in FIG. 5. The piston is mounted on a bracket 22 carried by an open support frame structure 24.

The upper surface of table 10 is provided with a series of parallel grooves each of which is adapted to receive the upper run of a conveyor belt 26. Each belt 26 is entrained about a driving rod 28 disposed beyond the downstream side of the table 10 and a corresponding free running pulley 30 mounted on a pulley support bracket 32 carried at the upstream side of the table. A drive motor 34 is connected by a driving chain 36 to a driven sprocket 38 fixed to the driving rod 28.

Also mounted to the upstream side of the upper surface of the glass supporting table 10 is a cam guide 40. The latter has a thickness greater than the thickness of one of the glass sheets G and less than the thickness of the entire assembly A of glass sheets to be bent simultaneously. Quick disconnect lugs 42 are provided to enable ready removal and replacement of one cam guide 40 for another cam guide. Each cam guide 40 has a shaped inner edge 44 shaped to conform to a longitudinal side edge of the outline of the glass sheet to be shaped.

The table 10 is shown in the position it occupies when an assembly A of glass sheets G is mounted in abutting relation to the cam guide 40. The table 10 is disclosed as being positioned to the left of the apparatus and a two way piston 20 has the piston rod 18 extended so as to have the table in position for the assembly of glass sheets to be mounted in proper position on the table 10.

Certain safety glass windshields are required to have a pattern of coating material disposed on a portion of the surface of one of the glass sheets of the pair forming the safety glass windshield. A coating station 50, which may be similar to the coating station 14 depicted in U.S. Pat. No. 3,638,564 to Bernard H. Prange and Dean W. Gintert, the disclosure of which is incorporated by reference in this application, is provided. The coating station is preferably of the silk screening type and comprises a silk screen 52 containing an open area 54 through which coating material may be forced by action of a squeegee 56. The squeegee 56 is made of medium hard rubber having a durometer of 70 to 100 and is preferably mounted on a squeegee bar 58. A flood bar 60 is also associated with the screen 52. A camming mechanism 62 is provided to elevate or depress the squeegee bar and/or the flood bar so as to cause the squeegee 56 to apply pressure against the screen 52, thereby forcing coating material, such as an ink or a liquid dispersion of ceramic frit or whatever is to be applied against the upper surface of the upper glass sheet through the open area 54 in a manner well known in the silk screening art.

The camming mechanism 62 is supported at each end of a cross bar 64. The camming mechanism is pivotally attached to the cross bar 64 and is connected at one end to the squeegee bar 58 and at its other end to the flood bar 60. The cross bar 64 is interconnected between a pair of reversible drive chains 66 through end lugs 67, each of which is affixed to a corresponding link of one or the other of the reversible drive chains 66. The reversible drive chains 66 are driven by a drive rod 68 through sprocket connections 69. A reversible drive motor 70 is directly connected to the drive rod 68.

The screen 52 including its open area 54 is fixed to a rectangular inner frame 71. The latter in turn is supported on a rectangular outer frame 72 by frame connecting means 73. The rectangular outer frame 72 is movably mounted with respect to the open support frame structure 24 by means of vertically adjustable pistons 74, one of which is provided for each of the four corners of the rectangular outer frame 72.

The rectangular outer frame also supports a number of open casings 76 each of which is constructed to receive a bracket 78 in vertically slideable relation thereto. The illustrative embodiment shows three brackets 78. However, more or fewer brackets may be provided as desired. Brackets 78 are preferably aligned with one another to receive a common shaft 80. A series of nipper rolls 82 are mounted along the length of the common shaft. The nipper rolls are made of deformable rubber or other rubber-like material and have a durometer sufficient to deform upon coming into pressurized engagement with the upper surface of a glass sheet when the latter mounted on the table 10 is moved from the upstream or loading position depicted in FIG. 1, which is the position of loading through the fluid removal position depicted in FIG. 3.

The hardness of the nipper rolls must be sufficient to enable the rolls to avoid picking up glass chips from the upper surface of assembly A as the latter passes under the nipper rolls en route from the glass loading position. However, the rolls must be sufficiently soft to deform on making rolling pressurized contact with the assembly. An acceptable working range for the nipper rolls is 50 to 90 durometer and 60 durometer rolls have been used successfully in commercial production of bent laminated safety glass windshields for automobiles.

A series of adjustment cranks 84, one for each vertically adjustable bracket 78, is connected to the bracket associated therewith to provide vertical adjustment therefor relative to the outer wall of the upstream side of the rectangular outer frame 72. Adjustment of the vertical position of the bracket 78 by the adjustment cranks 84 establishes the vertical position of the nipper rolls 82 relative to the top surface of table 10.

The apparatus also includes a glass unloading station in the form of a caster table 86. The latter is provided with a series of free running casters 88, each supported by a bracket 90 on one of the series of horizontal slats 92 in such a manner that the common tangential plane formed by the upper portions of the surfaces of the casters 88 lies in the same plane of support as provided by the top surface of table 10 and the upper run of the conveyor belts 26. The slats 92 are interconnected by cross beams 94, and the latter in turn are mounted on vertical support legs 96. Stop members 98 are attached to the downstream end of certain slats 92.

In a typical operation, a pair of glass sheets G, having previously been cut to outline and having a total thickness slightly greater than the thickness of the cam guide 40, are mounted in aligned relationship, preferably with parting material disposed therebetween, with one curved end of the glass sheets abutting against the curved surface edge 44 of the cam guide 40. The table 10 is in the upstream or glass loading position shown in FIGS. 1 and 2 to receive the glass sheet assembly A for loading. The adjustment cranks 84 have previously been arranged so that the nipper rolls 82 are disposed in such a manner that a tangent common to their lower curved surfaces lies in a plane above the plane of the top surface of table 10 that is slightly less than the thickness of the glass sheet assembly.

Figure 2:
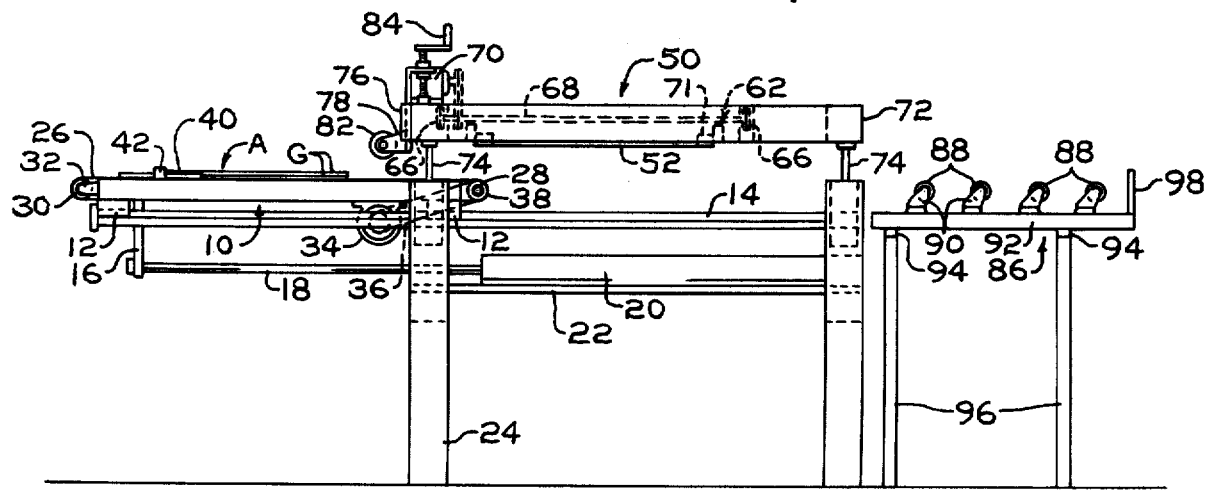
FIG. 2 is an end view of the apparatus depicted in FIG. 1 and showing the various elements with a pair of glass sheets forming an assembly mounted on a table preparatory to being treated to remove the fluid entrapped at the interfacial surface between the glass sheets.

The two way piston 20 is actuated to transfer the table from the upstream position depicted in FIG. 2 to the downstream position depicted in FIG. 5.

As seen in FIG. 3, the assembly passes beneath the series of nipper rolls 82 which are held in pressurized engagement against the upper surface of the assembly. This causes the lower portion of the nipper rolls to become distorted and also causes the nipper rolls to apply a pressure that forces fluid entrapped at the interfacial surface between the two glass sheets G of the assembly A to be forced out. In one embodiment of the invention where it is unnecessary to coat the assembly with a pattern of coating material such as paint or frit or electroconductive material, the table 10 moves downstream in one uninterrupted motion to the downstream position of FIG. 5, where the driving rod 28 which actuates the conveyor belts 26 is adjacent to the free running casters 88 of the caster table 86. When the table 10 arrives at the latter position, the glass sheet assembly is transferred directly from the table 10 to the caster table 86 in one continuous movement by actuating the drive motor 34 which causes the belts 26 to move simultaneously and drive the assembly A from the table 10 to the caster table 86. Piston 20 then extends piston rod 18 to return the table 10 to the upstream position.

In case it is desired to produce a laminated safety glass windshield having a pattern of coating material on a surface thereof, the two way piston 20 is stopped after retracting the table 10 downstream a sufficient distance for the assembly A to be in alignment under the silk screen 52 at the coating station 50. It is appreciated that the assembly of glass sheets arrives at the coating station 50 with sufficient fluid removed from the interfacial surface between the glass sheets so that the movement of the squeegee 56 forcing the coating composition through the relatively open area 54 of the silk screen 52 does not disturb the alignment of the glass sheets relative to one another. When the table with the glass sheets supported thereon is moved from the upstream position of FIGS. 1 and 2 to the coating position of FIG. 4, the rectangular outer frame 72, and the rectangular inner frame 71 that supports the screen 52 are sufficiently high to provide clearance for the assembly of glass sheets to pass therebeneath.

When the assembly arrives at a position in proper alignment with the silk screen 52, as depicted in FIG. 4, the camming mechanism 62 is operated so that the squeegee bar 58 forces the squeegee 56 into pressurized engagement against the upper surface of the silk screen 52. This forces the coating composition through the openings in the open area 54 to provide a pattern of coating composition desired onto the upper surface of the upper glass sheet of the assembly as the squeegee 56 and its squeegee bar 58 move in one direction across the entire face of the silk screen 52.

When the squeegee 56 arrives at a terminal position after having passed over the entire silk screen 52, the vertically adjustable pistons 74 are extended to raise the rectangular outer frame 72, the rectangular inner frame 71 and the silk screen 52 including its open area 54 to an elevated position. The drive motor 34 is actuated to cause the conveyor belts 26 to move the assembly of glass sheets onto the free running casters 88 of the caster table 86. While a timer is usually used to operate the drive motor 44 only for a sufficient time for the glass sheet assembly to clear the table entirely and to be mounted on the casters 88, the stop members 98 are provided to insure that the glass sheet assemblies A do not roll off the caster table 86.

While the table 10 is being returned to its loading or upstream position depicted in FIGS. 1 and 2, the camming mechanism 62 is adjusted so that the squeegee bar 58 is raised and the flood bar 60 is lowered. In its lowered position, the flood bar 60 is spaced a short distance from the upper surface of the silk screen 52 so as to insure that the coating mechanism is of uniform thickness when the flood bar moves together with the squeegee and the squeegee bar 58 back to the original position to prepare the silk screen apparatus for a subsequent silk screening operation in a manner well known in the art. When the table is loaded with another assembly, the camming mechanism 62 is again actuated to lower the squeegee 56 and the squeegee bar 58 so that when the next glass sheet assembly arrives at the coating station 50, the silk screen 52 is prepared to provide a pattern of coating onto the next sheet to be treated.

The apparatus described previously is capable of use in preparing glass sheet assemblies that are either uncoated or pattern coated. In case of uncoated assemblies, the apparatus is arranged with the nipper rolls 82 positioned in a downward position while the vertically adjustable pistons 74 are extended in an upward position to support the silk screen 52 in spaced relation above the path taken by the upper surface of the glass sheet assembly A. The rolling pressure of the nipper rolls 82 against the upper surface of the uncoated assemblies is sufficient to force out entrapped fluid as the assemblies move transversely downstream with their entire width subjected to said free rolling pressure. The table 10 returns to the upstream loading position without the glass assembly with its upper surface spaced below the nipper rolls 82.

When coated glass sheet assemblies are to be treated, the use of the nipper rolls 82 to provide rolling pressure to remove entrapped fluid is optional and the adjustment cranks 84 may be operated to lift the nipper rolls 82 to positions where they are spaced above the upper surface of the glass sheet assemblies when a glass loaded table moves downstream into the coating station 50, even when the vertically adjustable pistons 74 are retracted to support the silk screen 52 in a lowered position where the screen 52 is so low that the pressure from the squeegee 56 that forces the coating composition through the open area 54 of the silk screen 52 also applies sufficient pressure on the upper surface of the glass sheet assembly A as it moves completely across the length of the assembly as to force fluid entrapped between the glass sheets of the assembly to be removed from the assembly.

Of course, if it becomes necessary, it is possible to adjust the position of the nipper rolls 82 relative to the rectangular outer frame 72 to a vertical position where they make pressurized rolling contact with the upper surface of the assembly passing thereunder en route to the coating station 50 even when the silk screen 52 is supported in spaced relation to the upper surface of the glass sheet assembly A. Of course, when the assembly is aligned with the silk screen 52 in position for coating the desired pattern, the trailing edge of the glass sheet assembly is downstream of the position occupied by the nipper rolls 82 so that there is clearance between the upstream side of the movable table 10 and the nipper rolls 82, even when the silk screen 52 is lowered to the position most effective for coating, namely, in substantial contact with the upper surface of the assembly A. On the return of the table 10 to the loading position, the silk screen 52 is elevated somewhat to provide clearance for the return of the table 10.

The form of the invention as shown and described in this disclosure represents an illustrative preferred embodiment and certain modifications thereof. It is understood that various changes may be made without departing from the gist of the invention as defined in the claimed subject matter which follows.

I claim:

1. In a method of fabricating curved glass windshields comprising a pair of glass sheets of matching curvature, wherein said pair of glass sheets is assembled in aligned stacked relation with one sheet of said pair forming the upper sheet of said assembly and the other sheet of said pair forming the lower sheet of said assembly, said sheets are mounted in said assembled relation on a bending mold, and said mold moved into an enclosed hot atmosphere where said glass sheets are subjected to an elevated temperature sufficient to soften said glass sheets so that they conform to the shape of the mold and to one another so that said glass sheets are capable of lamination to one another without breakage, wherein said mold with said glass sheets mounted thereon is moved at a speed that changes sufficiently to tend to cause the upper glass sheet of said pair to slide out of alignment with said lower glass sheet, the improvement comprising assembling said glass sheets in the flat condition in aligned relation to one another, supporting the assembly so formed beneath pressure applying means, providing relative motion between said assembly and said pressure applying means across an entire dimension of said assembly while said pressure applying means is held in pressurized engagement against the upper surface of said assembly to force out sufficient fluid entrapped between said glass sheets to increase the friction between said glass sheets of said assembly before mounting said assembly on said bending mold so that said sliding of said upper glass sheet relative to said lower glass sheet is reduced sufficiently during said mold movement to maintain said glass sheets in approximate alignment during passage of said assembly laden mold through said hot atmosphere.

2. The improvement as in claim 1, wherein parting material in the form of a fluid dispersion of small particles is applied to an interfacial surface between said glass sheets before said sheets are assembled in said aligned relation to prevent said glass sheets from fusing together while said assembly is exposed to said elevated temperature, said parting material tending to reduce the friction between said glass sheets of said assembly.

3. In the method as in claim 1, wherein said curved glass windshields have a pattern of coating material applied to an outwardly facing surface of one of said glass sheets, the further step of applying said pattern of coating material to the upper surface of the upper glass sheet of said aligned assembly prior to mounting said aligned assembly on said bending mold.

4. In the method as in claim 3, including passing said assembly beneath freely rotatable nipper rolls held in pressurized engagement against the upper surface of said assembly prior to applying said pattern of coating material to force out said entrapped fluid.

5. In the method as in claim 3, including passing a squeegee held in pressurized engagement against the upper surface of said assembly after applying said pattern of coating material to force out said entrapped fluid.

6. In the method as in claim 1, including passing said assembly beneath freely rotatable nipper rolls held in pressurized engagement against the upper surface of said assembly prior to mounting said assembly on said bending mold.

* * * * *